United States Patent Office 3,046,691
Patented July 31, 1962

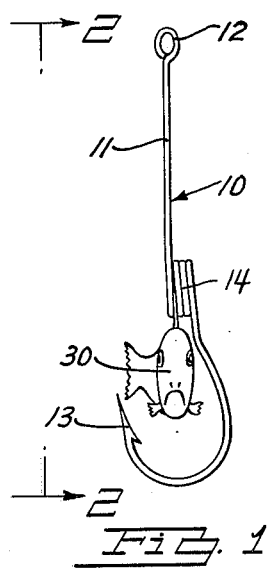
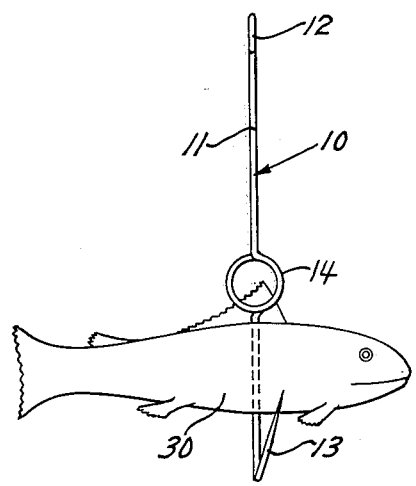
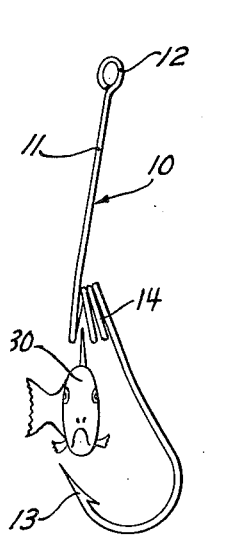
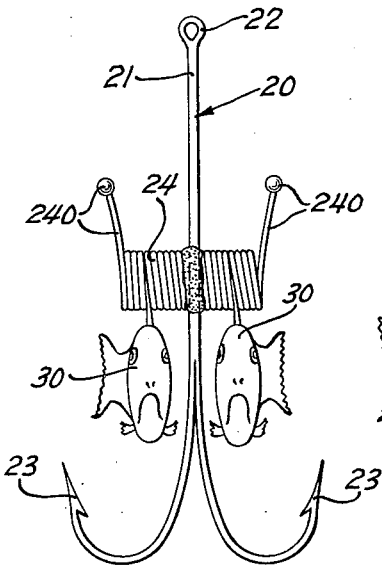
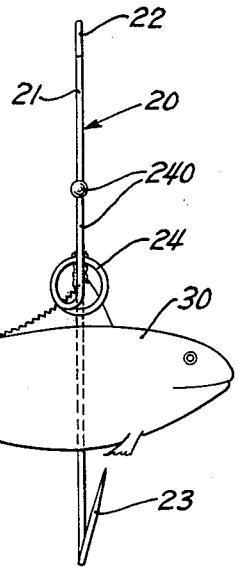

3,046,691
LIVE BAIT FISH HOOKS
William R. Courtright, 11335 Artesian, Detroit, Mich.
Filed Aug. 22, 1957, Ser. No. 679,694
1 Claim. (Cl. 43—44.8)

This invention relates to live bait fish hooks and in particular to improved and simplified means for holding live bait in the desired proximate relationship to the barb thereof.

The primary object of the instant invention is to provide a live bait fish hook including means at the shank thereof for holding live bait such as a minnow or the like by its dorsal fin in proximity to the barb of the hook, which means is simple and effective, does not kill the live bait, and is readily manipulated to permit the fisherman to bait the hook with live bait, such as minnows, and remove the live bait therefrom.

Other objects of the invention will become apparent by reference to the following detailed description taken in connection with the accompanying drawing, in which:

FIG. 1 is a side elevational view of a live bait fish hook embodying the invention.

FIG. 2 is a front elevational view taken on the line 2—2 of FIG. 1.

FIG. 3 is a side elevational view similar to FIG. 1 with the bait engaging loop sprung open to receive the live bait.

FIG. 4 is a side elevational view of a double or gang live bait fish hook embodying the invention.

FIG. 5 is a front elevational view showing the live bait retainer and hook at the left side of the gang live bait hook disclosed in FIG. 4.

Referring now to the drawing wherein like reference numerals refer to like and corresponding parts throughout the several views, the live bait fish hook 10 disclosed in FIGS. 1–3 inclusive to illustrate the invention consists of a shank 11 having an eye 12 formed at its upper end and a barbed hook 13 connected to the lower end of said shank by a coiled spring live bait holder 14 disposed with the axis of the coil normal or substantially normal to the said shank 11.

The coiled spring live bait holder 14 of the live bait fish hook 10 has one end thereof secured to the shank 11 and the other end thereof secured to the hook 13. Although the live bait fish hook 10 is described as a multi-element assembly, if desired, the said live bait hook 10 may be fabricated as a unitary structure.

The live bait hook 10 is shown in FIG. 3 with the shank 11 and hook 13 thereof flexed in angular relationship sufficiently to open up the coils of the coiled spring live bait holder 14 thereof to receive the dorsal fin of a live bait 30 such as a minnow or the like.

Referring now to FIGS. 4 and 5, an alternate embodiment of the invention is illustrated wherein a two-gang live bait fish hook 20 consists of a shank 21 having an eye 22 formed at its upper end and two oppositely facing barbed hooks 23 formed at its lower end integral therewith. Welded or otherwise secured to the said shank 21 at a suitable distance above the barbs of the barbed hooks 23 is a coiled spring double live bait holder 24 disposed with the axis of the coil normal or substantially normal to the said shank 21 and parallel or substantially parallel to the said barbed hooks 23.

The coiled spring double live bait holder 24 of the two-gang live bait fish hook 20 is preferably constructed of a single coiled spring telescoped at its central portion over and secured to the shank 21. The said coiled spring bait holder 24 preferably has its outer ends formed into levers 240 projecting upwardly in spaced relationship to the shank 21 over the barbed hooks 23. Squeezing of either of the said levers 240 opens up the coil spring live bait holder 24 adjacent thereto to receive the dorsal fin of a live bait 30.

Live bait fish hooks embodying the invention have been found to be very effective in fishing for larger fish when baited with live bait in the form of minnows and the like. The live bait stays alive for long periods of time depending upon how rapidly it is drawn through the water. Live bait is readily engaged between the convolutions of the coiled spring bait holder of the live bait fish hook and is easily removed therefrom by manually flexing the live bait holding element.

Although but two embodiments of the invention have been disclosed and described in detail, it is obvious that many changes may be made in the size, shape, arrangement and details of the various elements of the invention as defined by the appended claim.

I claim:

A live bait fish hook including an upper vertical shank portion, a lower open looped barbed hook portion, and an intermediate coiled spring bait holding portion of at least two full coils having a horizontal axis substantially normal to said shank portion and interconnecting said shank and hook portions with said shank and hook portions disposed at opposite ends of said coiled spring portion, the said open loop of said barbed hook portion being disposed below said shank portion and said coiled spring portion and in a plane substantially in alignment with the horizontal axis of said coiled spring portion.

References Cited in the file of this patent

UNITED STATES PATENTS

| | | |
|---|---|---|
| 62,042 | Lee | of 1867 |
| 1,286,095 | Powell | Nov. 26, 1918 |
| 1,388,386 | Svenson | Aug. 23, 1921 |
| 1,869,293 | Wolford | July 26, 1932 |
| 2,242,708 | Lancaster | May 20, 1941 |
| 2,454,879 | Mattingly | Nov. 30, 1948 |
| 2,636,306 | Sokolik | Apr. 28, 1953 |
| 2,741,060 | Rowlance | Apr. 10, 1956 |
| 2,808,678 | Leonardi | Oct. 8, 1957 |

FOREIGN PATENTS

| | | |
|---|---|---|
| 23,462 | Great Britain | of 1907 |